United States Patent [19]

Meacock, II et al.

[11] 4,269,282
[45] May 26, 1981

[54] GEAR SHIFT CONTROL

[75] Inventors: Leslie A. Meacock, II, Emmaus; Edward C. Merkel, Palmerton, both of Pa.

[73] Assignee: Mack Trucks, Inc., Allentown, Pa.

[21] Appl. No.: 44,165

[22] Filed: May 31, 1979

[51] Int. Cl.³ .............................................. B62D 33/06
[52] U.S. Cl. ................................. 180/328; 180/89.14; 74/473 R
[58] Field of Search ............ 180/77 TC, 89.14, 89.15; 74/473 R; 296/190; 248/601, 613, 623

[56] References Cited

U.S. PATENT DOCUMENTS

| | | | |
|---|---|---|---|
| 1,713,244 | 5/1929 | Tunney | 74/473 R |
| 1,762,132 | 6/1930 | Fishburn | 74/473 R |
| 2,136,697 | 11/1938 | Lapsley | 74/473 R |
| 2,854,088 | 9/1958 | Dence | 180/77 TC |
| 3,243,239 | 3/1966 | Hackman | 308/26 |
| 3,329,229 | 7/1967 | Makha | 180/77 TC |
| 3,392,597 | 7/1968 | Herrmann | 74/473 R |
| 3,476,202 | 11/1969 | Dudley | 180/77 TC |
| 3,926,068 | 12/1975 | Jantzen | 74/473 R |
| 3,958,659 | 5/1976 | Selman | 296/190 |

FOREIGN PATENT DOCUMENTS 2037310 4/1971 Fed. Rep. of Germany .
2264121 7/1973 Fed. Rep. of Germany ........ 74/473 R

*Primary Examiner*—Robert R. Song
*Attorney, Agent, or Firm*—Bernard & Brown

[57] ABSTRACT

A gear shift lever for a tilt cab vehicle that moves with the cab when it is tilted for access to other mechanical parts of the vehicle, for instance, the engine. The lever apparatus is resiliently engaged with the cab in a manner which substantially isolates the lever from cab vibrations. More particularly, the lever includes a lower end that is specially-mounted and releasably engaged with a complementary portion of a gear transfer mechanism, and an upper end available for shifting by an operator. The gear shift lever is preloaded to maintain the proper operative relationship between the shift lever and the complementary portion of the transfer mechanism when the cab is in an untilted or closed disposition. A protective cover is integrated with the lever apparatus to seal substantially the cab interior from the engine compartment and thereby prevent air and exhaust fumes from leaking into the cab.

31 Claims, 3 Drawing Figures

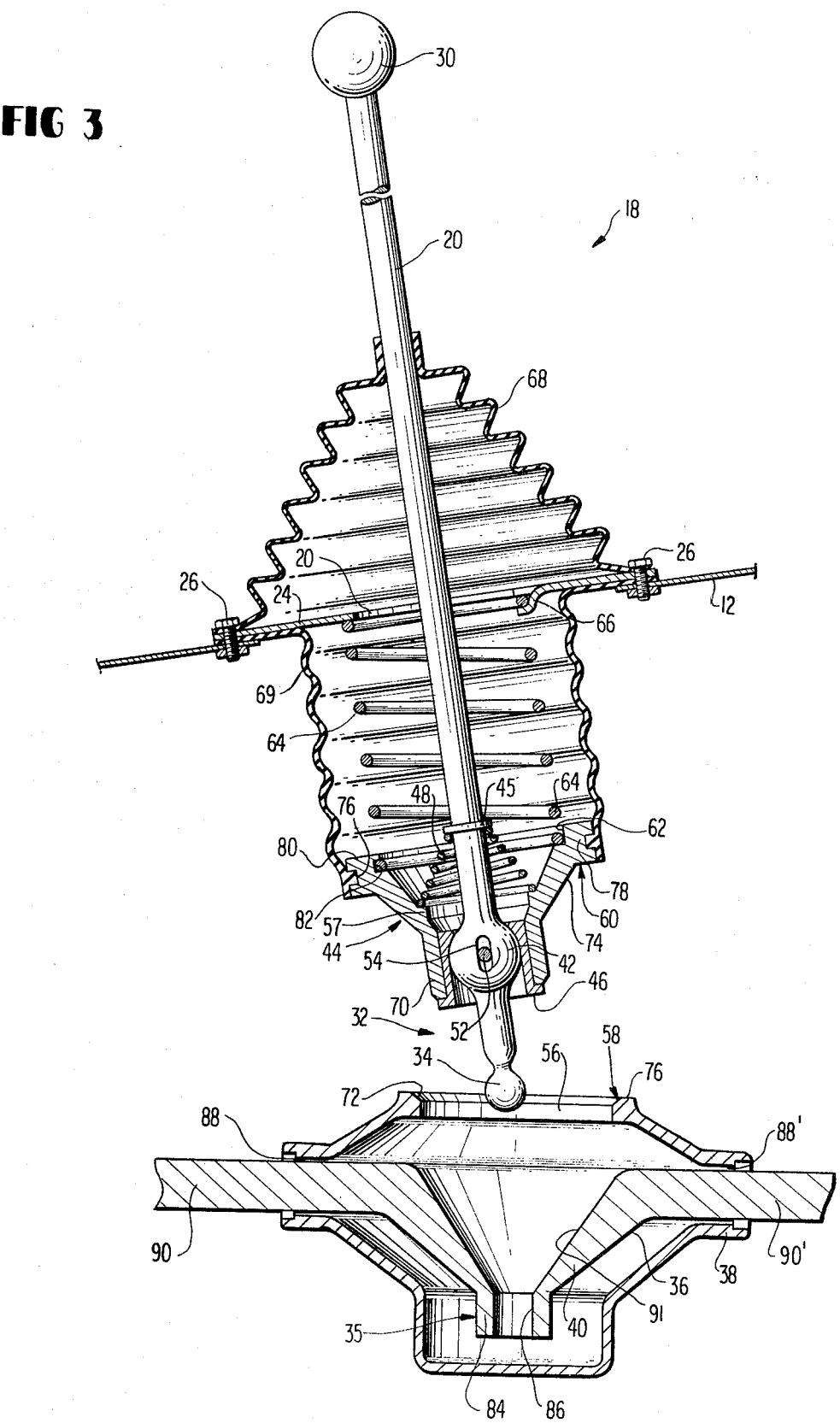

GEAR SHIFT CONTROL

BACKGROUND OF THE INVENTION

Gear shift levers of tilt cab vehicles have the characteristic of extending between the cab and the other portion of the vehicle at a position that is displayed from the pivot or hinging point of the cab to the vehicle chassis. The gear shift lever is secured to one or both of the cab and a cooperating gear shifting mechanism. In order to provide quick access to the parts of the vehicle beneath the cab, some provision must be made for the cab to be separated readily from the vehicle without laboriously dismantling the gear shift lever from its adjacent gear shifting mechanism that is outside of the cab and is usually beneath the floor of the cab.

Conventionally, the problem of gear shift lever interference with cab tilting has been overcome by, for instance, the lever being secured to the shifting mechanism so that no portion of the lever travels with the cab when the latter is tilted in which case the floor of the cab may have sufficient articulation to permit the cab to tilt without disconnecting the shifting lever, see U.S. Pat. No. 3,329,229. Alternatively, the shifting lever has been mounted on the floor of the cab with a portion extending therebelow to engage in a quick-releasing manner with a cooperating member of the gear shifting mechanism to permit the shifting lever to move readily upwardly with the cab during tilting, see West German Offenlegungsschrift No. 20 37 310, application date July 28, 1970.

In a commercial embodiment employed in this country, a shift lever is mounted on the floor of a cab to disengage from other parts of the shifting mechanism remaining on the frame when the cab is tilted forward. In this commercial version the shift lever is pinned directly to the cab and includes a bell-shaped portion in the form of a socket extending downwardly beneath the cab floor for engaging a ball member in that portion of the shifter crank mechanism secured to the vehicle beneath the cab floor. In another form of tilt cab-shift lever construction, it has also been proposed to provide an extensible connection between the shifting mechanism beneath the cab and the shifting lever mounted on the cab, so that the connection can extend an appropriate length as the cab tilts upwardly.

Regardless of which type of these construction is provided to permit the cab to tilt without dismantling the gear shift lever, the latter has always been more or less non-resiliently connected to one or both of the cab or the underlying gear shifting mechanism into which the lever extends during operation of the vehicle. Such a connection results in vibrations of the cab, and/or of those other vehicle parts such as the drive mechanism, being transferred to the shifting lever and to the driver as he moves the shifting lever. These vibrations and other cab movements are particularly acute when the rear of the cab is sprung to the vehicle chassis, and the cab is pivoted about its front portion. The resulting wear at the releasable connection can adversely affect shifting to proper gear ratio and may even lead to the vehicle being thrown out of gear during operation.

An example of the kind of problems associated with gear shift levers discussed above is shown in the German Offenlagenschrift No. 20 373 10. As can best be seen in FIGS. 2 and 3, the gear shift lever moves with the cab and is tilted forward as shown in FIG. 1, leaving a funnel or socket portion of the shifting mechanism within the gear transfer mechanism and chassis of the truck. It should be noted that the engagement of the lower finger of the shift lever 5 with an eyelet of the funnel imparts to the shifting shaft the desired movement for shifting of the transmission when the lever is moved by the operator. Although the gear shift lever is releasably connected with the lever socket, the lever is fixedly secured to bearings of a base mounted on the engine floor. As a result, even though shift lever 5 can move with the cab floor during the tilting mode, any vibrations of the cab, as well as those imparted to the lower portion of the shifting lever by other parts of the vehicle during its operation, will be transferred directly to the operator through bearing 4 and the lever. As noted above, this type of structure is quite disadvantageous.

In addition to the problems mentioned above with regard to vibration, the tilt cab constructions of the past have often not provided an acceptable seal between the cab and the portions of the engine and chassis beneath the cab to ensure prevention of leakage of those fumes and other gases which may accumulate beneath the cab. For example, in a chassis-mounted shift control, typically a dynamic-type, separating cab seal is employed which disengages when the cab is raised, such as the seal between a flexible boot which moves with the cab and a shift layer which is mounted to the frame. Because of potentially poor seal to cab alignment and durability, the dynamic seal usually results in a leakage path for under cab air and fumes to be admitted in the cab. An alternative approach, as discussed above, includes the mounting of the shift control rigidly to the cab floor. Although this may provide a positive cab seal it suffers from the vibration problems transferred from the cab to the shift lever as discussed above.

BRIEF DESCRIPTION OF THE INVENTION

The present invention generally relates to an apparatus for overcoming the problems discussed above with regard to tilt cab vehicles in the transfer of vibrations and other movements of the cab to the shift lever, as well as sealing the interior portion of the cab from leakage of air and fumes beneath the cab. Features of the invention include the manner in which the shift housing is attached to the vehicle, as well as the manner in which the gear shift lever is integrated with the cab and with the gear shift housing when the cab is in an untilted or closed disposition. Features also include a sealing mechanism which prevents leakage of air and fumes beneath the cab into the interior portions of the cab through those areas adjacent the shifting mechanism.

There are several positions on a vehicle where the gear shift housing and its associated mechanism can be located, including the engine itself, the transmission and the chassis. It has been found that the chassis is typically the portion of a vehicle which incurs the least amount of vibration or other movement such as bounce and rebound during motion of the vehicle over terrain. In the preferred embodiments the present invention secures the gear shift housing and its associated mechanism to the chassis, and as a result a large part of the vibrations or other movements associated with other parts of the vehicle is eliminated from transfer to the shifting lever.

However, elimination or significant reduction or vibration or other movement imparted by the aforementioned elements of the vehicle does not dispense with all the kinds of motions which can be transferred to the gear shifting lever. The cab itself is still subjected to bounce and rebound and other vibrational movements which can be transferred to the shifting lever depending on the manner in which the lever is mounted on the cab. A feature of this invention is to isolate the lever from cab movement when the cab is in the closed position. This can be done by resiliently-securing the lever to the cab such that the movement of the cab relative to the lever is substantially dampened or eliminated thereby abrogating the adverse effects on the driver and the mechanism which would otherwise occur. In addition, in the invention flexible covers are integrated with the shifting mechanism to prevent the kind of leakage discussed above while allowing the shifting lever to move with cab to a tilted position.

As described above the features of the invention are in general terms. These and other features of the invention can be more readily appreciated from the following description of a preferred embodiment.

BRIEF DESCRIPTION OF THE DRAWINGS

FIG. 3 is a partial view of FIG. 2 enlarged and showing the cab in a slightly tilted disposition.

DETAILED DESCRIPTION OF THE PREFERRED EMBODIMENT

Figure 1:
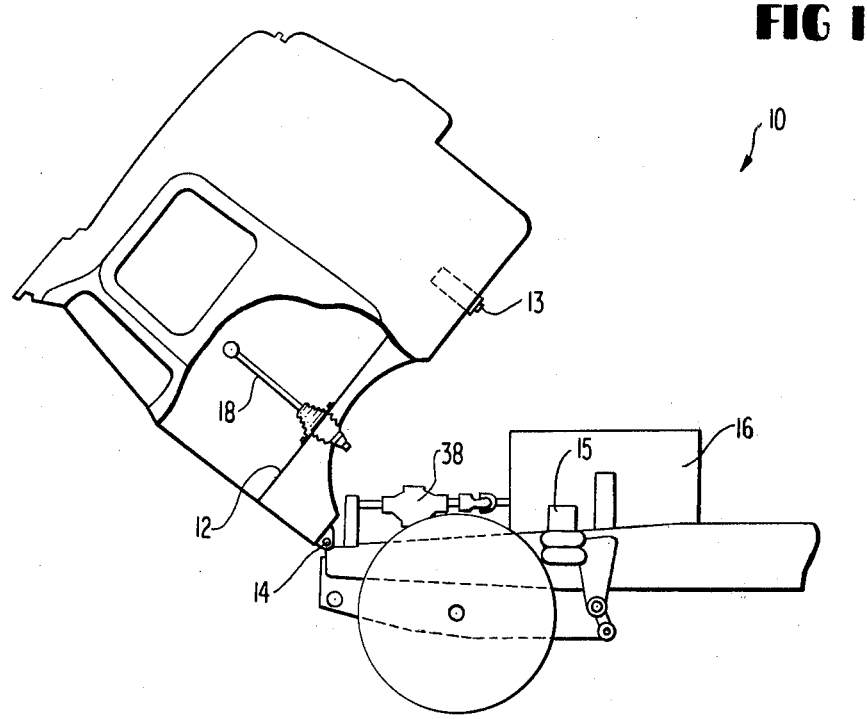
FIG. 1 shows generally a tilting cab incorporating the lever apparatus of the invention described herein.

As can be seen in FIG. 1, the truck 10 has a cab 2 with floor 12 and a tilting axis 14 which extends across the front of the cab. Beneath the cab is an engine 16 which is exposed when the cab is tilted forward along the axis 14. The rear portion of cab 2 includes a hook member 13 for releasably securing cab 2 to complementary portion 15 on the chassis. Complementary portion 15 is integrated with a spring mechanism to resiliently support cab 2 on the chassis. As hook member 13 and complementary portion 15 can be of conventional means known to those skilled in the art, they will not be described in detail herein.

Shift control apparatus 18 includes a support plate 24 having its center portion sufficiently removed to permit movement of the gear shift lever 20 in a plurality of directions to achieve the desired shifting of the gears, as well as to permit relative movement between the gear shift lever 20 and the floor 12 of the cab. Bolt holes are located along the periphery of support plate 24 for allowing apparatus 18 to be secured to the cab floor 12 by bolts 26.

Gear shift lever 20 has an upper end 30 with a gear shift knob or other grasping means exposed to the operator for shifting the latter into the desired gear ratios and drive directions depending upon the position of the gear shift lever. Gear shift housing 38 is located beneath the cab for receiving lower end 32 of shift lever 20 when the cab is in the closed position.

In this embodiment the gear shift housing 38 is fixed to the chassis of the vehicle beneath the cab. By integrating the gear shift housing with the vehicle in this manner very little, if any, vibration from other parts of the vehicle such as the engine or other portions of the frame are transferred to the gear shift housing itself. As a result, this location on the vehicle will minimize, if not eliminate entirely, vibrations and other movements from other parts of the vehicle which could be transferred through the housing 38 to the gear shift lever 20 when engaged with the elements of the housing 38. However, other positions of the housing may be used. For example, the gear shift housing 38 could be secured to the engine or to the transmission itself and still operate satisfactorily.

Gear shift crank 36, carried within a gear shift hosing 38, defines a bell-shaped socket portion 40 for receiving the ball portion 34 at the lower end of lever 20. Bell-shaped portion 40 may be generally conical in configuration, and has its larger open end exposed for receiving the ball portion 34 of the lever 20 when the lever is moved from a tilting cab position to a closed position, and has its smaller end 35 below the larger end to define a close tolerance area for engaging ball portion 34 of the lever 20 when the cab is closed and essentially horizontal. When in the closed position, movement of the lever 20 is transferred to the gear shift crank by engagement of the lever 20 with the smaller portion 35 of the bell-shaped portion 40.

The lever 20 defines another ball or rounded portion 42 between the support plate 24 and ball portion 34 at the end of the lever. Ball portion 42 cooperates with socket 46 in the lower end of generally conical shift cover assembly 44 to define the movement of the shift lever. A retaining spring 48, mounted on and around lever 20, engages a retaining clip 45 above ball 42. The upper end of spring 48 engages the lower surface of clip 45, and the lower end of spring 48 engages a bearing surface 57 positioned around the inner wall of assembly 44 to bias or preload the ball 42 upwardly into socket 46 whose upper open portion is smaller than the diameter of ball 42. To secure the lever for rotational movement within the socket 46, a pivot pin 52, mounted to socket 46, extends through slot 54 in ball 42 in a manner well known to those skilled in the art. As can be seen from FIG. 2, slot 54 extends in a vertical direction a distance considerably greater than the diameter of the pivot pin 52. This provides for selection for the operator when moving shift lever from side to side, as well as for movement between directions toward the front and rear of the cab.

Gear shift housing 38 defines an upper opening 56 for receiving the shift cover assembly 44 as the cab is moved from a tilted position to an untilted or closed disposition. Around the periphery of this opening are bearing surfaces 58 which engage and support the upper portion of shift cover assembly 44 in the closed disposition along complementary surfaces 60.

As can be more clearly seen in FIG. 3, assembly 44 has the shape of an inverted, right circular truncated cone with the lower base having the smaller radial dimension. Extending downwardly from lower base is a circular, tubular cylinder 70. Cylinder 70 carries on its inner wall socket 46 for contact with ball 42. Cam surface 72 of bearing surfaces 58 has substantially identical slope as the exterior surface 74 of the cone; this enables the assembly 44 to be positioned properly within housing 38 during movement of the cab toward a closed position and to be maintained centered within housing 38 once the closed position has been reached. This positioning results from the cam effect imparted to assembly 44 by surface 72 on housing 38. For instance, when moving the cab toward a closed position, if shift cover assembly 44 is not centered relative to opening 56, cam surface 72 engages exterior surface on assembly 44 and reacts therewith to cam the assembly 44 toward the center of the opening. Once in place, exterior surface 74 is engaged entirely about its circumference to maintain the correct position even during jounce and rebound or other vibrations imparted to cover assembly 44.

In addition to cam surface 72, housing 38 also defines a seating surface 76 also adjacent and circumscribing opening 56. Extending outwardly from assembly 44 at the upper end thereof is a circular flange 78 which is dimensioned to be in separable, contacting relationship with seating surface 76. In this manner when the cab is moved to the fully closed position, the flange member will be seated on seating surface 76, thus blocking further movement of assembly 44 in the downward direction. In this manner the vertical position of shift lever 20 within housing 38 is determined.

Inner surface 62 of the cover assembly 44 is configured to retain main spring 64. Extending upwardly from the flange 78 on assembly 44 is a circular rim 80 whose inner surface defines along at least a portion thereof a radially extending slot 82 for receiving and holding a bottom coil of main spring 64. The support plate 24 also defines a lip 66 for retaining the other end of the spring 64 and shift cover assembly 44 which in turn holds the shift lever 20 at ball 42. Thus, when the cab vibrates or makes other movement, this movement is substantially dampened if not eliminated completely by the action of main spring 64 against assembly 44 as supported by housing 38. The result is the transfer of relatively little movement of the cab to shift lever 20.

Spring 64 serves not only to dampen vibration, but also to maintain cover assembly 44 and ultimately shift lever 20 in the proper relationship with gear shift crank 36 in housing 38. Spring 64 is preloaded in the sense that when the cab is in the closed position the spring is placed under compression. As a result spring force is imparted to assembly 44 to maintain flange 78 seated against seating surface 76 of housing 38 and thus prevent vertical movement between housing 38 and cover assembly 44. Similarly, the spring force presses exterior surface 74 against cam surface 72, the reaction to which prevents substantial if any movement in the horizontal plane.

Figure 2:
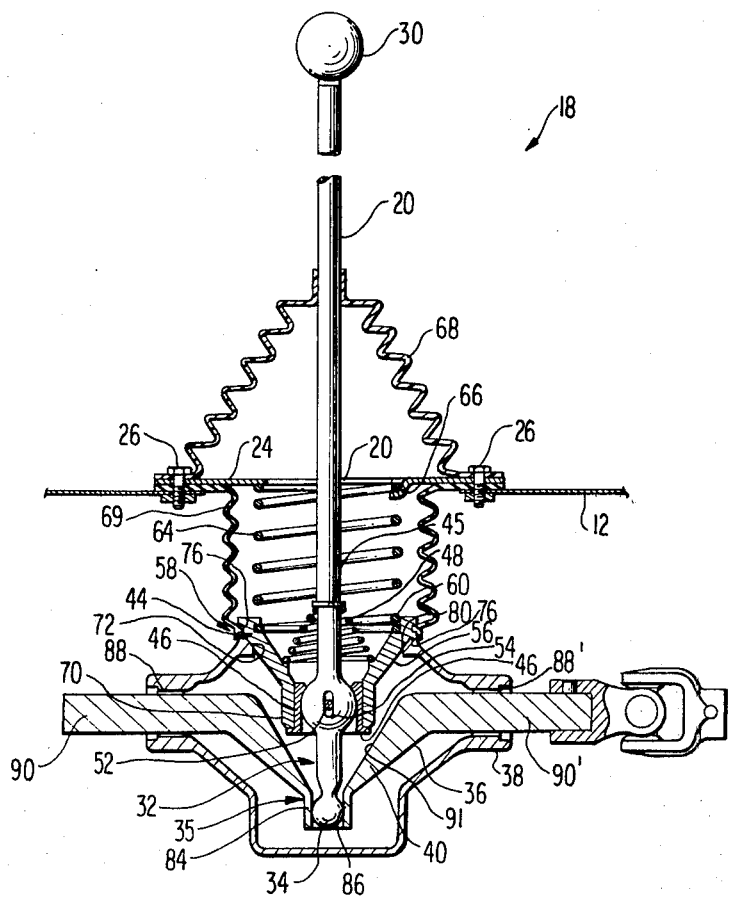
FIG. 2 is an enlarged cross-section of the shift apparatus shown in FIG. 1, taken along a line from front to rear of the vehicle, the rear of the vehicle being to the right as shown in FIG. 2.

The bell-shaped portion 40 of gear shift crank 36 has a configuration similar to that of cover assembly 44 in that it is an inverted, right circular truncated cone with the lower base having the smaller radial dimension. Extending downwardly from the lower base of bell portion 40 is ball-engaging tubular circular cylinder 48 having inner wall 86 for engagement with ball 34. As can be seen in FIG. 2 ball 34 is completely circumscribed by vertical inner wall 86 of circular cylinder 84; however, cylinder 84 is open at both ends to permit relative vertical movement of ball 34 and cylinder 84. Thus, movement of shift lever 20 during tilting and closing operations will not be transferred to the shifting mechanism, but all other movement, when the cab is in closed position, of shift lever 20 will be transferred through bell-shaped portion 40 to other elements of the shifting mechanism as desired.

For this purpose gear shift crank 36 includes rod members 90, 90' extending in opposite directions and secured to housing 38 by bearings 88, 88' which permit both linear and rotational movement. At least one of rod portions 90, 90' of gear shift crank 40 extending beyond housing 38 is connected to a universal joint in a manner which transfers both rotational and linear motion of the gear shift crank 36 through various gear shift ratios of the transmission as selected by the operator.

Inner conical surface 91 of bell shaped portion 40 cooperates with lower ball 34 to locate it properly within cylinder 34 during movement of cab toward a closed position. If shift lever 20 is not properly oriented during this operation inner surface 91 will engage ball 34 to cam and guide it into the proper position and thus acts as a complement to the similar action between housing 38 and cover assembly 40.

From the foregoing description it can be seen that when the cab is tilted forward, the gear shift lever 20 along with the main spring 64, retaining spring 48, and shift cover assembly 44 will be moved with the cab floor leaving the gear shift housing and its gear shift crank with the chassis of the truck. During the tilting forward mode, the main spring will expand somewhat since it is maintained under compression when in the engaged position. Of course, when the cab is tilted back to an engaged or closed position, the main spring 64 will be compressed to maintain secure engagement between shift cover assembly 44 and gear shift housing 38.

Flexible upper bellows 68 and another flexible bellows 69 completely circumscribe lever 20 on each side of cab floor 12 to protect the cab interior from leakage. Upper bellow 68 has its upper end anchored directly to gear shift lever 20 with the lower end of the flexible bellows secured to support plate 24 about the periphery thereof by bolts 26. Bellows 69 has one end secured to circumferential groove 76 with the other end secured to support plate 24 about the periphery thereof by the same bolts 26 which are used to secure upper bellows 68 to plate 24. This dual flexible bellow configuration has the advantage of not only providing an esthetic consideration for that portion of the bellows exposed to the cab but also safety features such as the prevention of gas fumes beneath the cab floor from passing into the cab along the interface of the shift lever with the cab floor.

For example, when the cab is in the closed position, as shown in FIG. 2, any fumes or air which could accumulate in the vicinity of the gear shift housing 38 are sealed from the interior of the cab by the flexible boots 68, 69. When in this closed disposition the conical shift cover becomes an integral part of the gear shift housing 38, held in place by main spring 64, which is compressed to design height by the weight of the cab. Thus, the interface between the shift cover assembly 44 and gear shift housing 38 is essentially sealed against leakage of the fumes therethrough. As boot 69 is secured at each end entirely about the periphery of shift cover assembly 44 and support member 24 it provides a barrier to any leakage into the cab. Similarly, the upper boot 68 completely circumscribes gear shift lever, and, as a result may fumes or air or any other particles which for some reason may find their way through the barrier provided by the lower boot 69 and the interface of shift cover 44 and gear shift housing 38 are prevented from passing into the cab. Thus, upper boot 68 provides a secondary barrier in case the sealing efficiency of the lower boot 69 should be broken for whatever reason.

Not only does the double boot design provide a double seal when the cab is in the closed position, when the cab is raised to surface the upper boot will still prevent any gases or fumes from being transferred into the cab.

Although the present invention has been described with reference to a preferred embodiment, alterations and rearrangements in the device can be made, and still the result would fall within the invention.

What is claimed is:

1. A tilt cab vehicle having a gear shift lever apparatus that moves with the cab when it is tilted for access to other parts of the vehicle, comprising
   (a) a tiltable cab having a floor and being tiltable from a closed position where said cab covers certain parts of said vehicle and an open position where said certain parts of said vehicle are exposed for access;
   (b) a shift lever;
   (c) means for transferring shift lever motion to a gear train in said vehicle;
   (d) said shift lever, extending through said cab floor, having an upper end exposed within the cab for shifting by an operator and a lower end in releasable engagement with said means for transferring the lever motion to the gear train;
   (e) said shift lever being tiltable with said cab, said lower end being disengaged from said transfer means when said cab is in the open position and engaged with said transfer means when said cab is in said closed position;
   (f) isolation means for substantially isolating said lever from cab movement when said cab is in the closed position; and
   (g) fixed support means fixed to said vehicle substantially independently of movement of said tilt cab for supporting said shift lever when said cab is in said closed position, said isolation means including resilient means for biasing said lever into engagement with said fixed support means and maintaining engagement therewith while the cab is in the closed position such that movement of the cab in the closed position is substantially independent of said shift lever.

2. The vehicle according to claim 1 wherein said isolation means includes said resilient means located below said cab extending under compression between said cab and said lever.

3. A tilt cab vehicle having a gear shift lever apparatus that moves with the cab when it is tilted for access to other parts of the vehicle, comprising
   (a) a tiltable cab having a floor and being tiltable from a closed position where said cab covers certain parts of said vehicle and an open position where said certain parts of said vehicle are exposed for access;
   (b) a shift lever;
   (c) means for transferring shift lever motion to a gear train in said vehicle;
   (d) said shift lever, extending through said cab floor, having an upper end exposed within the cab for shifting by an operator and a lower end in releasable engagement with said means for transferring the lever motion to the gear train,
   (e) said shift lever being tiltable with said cab, said lower end being disengaged from said transfer means when said cab is in the open position and engaged with said transfer means when said cab is in said closed position; and
   (f) isolation means for substantially isolating said lever from cab movement when said cab is in the closed position, said isolation means including resilient means below said cab floor extending under compression between the cab floor and said lever.

4. The vehicle according to claim 2 wherein said resilient means includes a spring for biasing said lever towards said transfer means when said cab is in said closed position.

5. The vehicle according to claim 3 wherein said spring is a helical spring circumscribing said lever, and having one end engaged with said cab floor and the other end operatively engaged with said lever.

6. The vehicle according to claim 4 wherein said means for transferring the lever motion includes a gear shift housing, at least one link member operatively connected to said housing to transfer the motion of said lever to the gear train of said vehicle, and means connected to said link member for receiving the lower end of said lever when said cab is in the closed position, to transfer the movement of said shift lever to said link member.

7. The vehicle according to claim 6 comprising means for receiving the lower end of said spring and holding said lever for movement within a predetermined area of said gear shift housing.

8. The vehicle according to claim 6 wherein said lever defines a ball portion above the lower end of the lever, and said means for holding the lever for movement within the gear shift housing includes a socket means for engaging said ball portion.

9. The vehicle according to claim 7 comprising a shift cover member having a lower end for carrying said socket and an upper end for engaging said helical spring, said gear shift housing defining an opening for receiving said shift cover member with the lower end of said lever extending therethrough into said gear shift housing when said cab is in said closed position, said shift cover member defining a rim portion adjacent the upper portion thereof for engaging the edge of said opening defined by said gear shift housing, and a retaining spring having one end secured to the lever member and the other end secured to an inner portion of said shift cover member to bias said lever upwardly and said ball portion into engagement with said socket means carried by the shift cover member.

10. The vehicle according to claim 8 wherein said means for receiving said lower end of said lever includes a bell-shaped member having a larger end extending upwardly; and a smaller end below said upper end, said smaller end having an opening slightly greater than the lower end portion of the lever and being connected to said link whereby movement of said lever when in an engaged position with said smaller end will be transferred to said link and to the gear train of said vehicle.

11. The vehicle according to claim 1, 2, 3, 4, 5, 6, 7, 8, or 9 further comprising means for sealing the interface between said shift lever and said cab floor.

12. The vehicle according to claim 10 wherein said sealing means includes an upper flexible sealing member circumscribing an upper portion of said shift lever exposed within said cab, said upper sealing member having an upper end sealingly engaged with and anchored to said shift lever and a lower end sealingly engaged with said cab floor.

13. The vehicle according to claim 10 wherein said sealing means includes a lower flexible sealing member circumscribing a lower portion of said shift lever extending below said cab floor, said lower flexible sealing member including an upper end in sealing relationship with respect to said cab floor and a lower end in sealing engagement with said shift lever.

14. The vehicle according to claim 11 wherein said sealing means includes an upper flexible sealing member circumscribing an upper portion of said shift lever exposed within the cab, said upper sealing member having an upper end in sealing engagement with and anchored to said shift lever and a lower end in sealing engagement with the cab floor, a lower flexible sealing member circumscribing a lower portion of said shift lever extending beneath the cab floor, said lower flexible sealing member having an upper end in sealing engagement with the cab floor, and a lower end in sealing relationship with respect to the shift lever.

15. The vehicle according to claims 4, 5, 6, 7, 8 or 9 comprising an upper sealing member circumscribing an upper portion of said shift lever exposed within the cab, said upper sealing member having an upper end in sealing engagement with and anchored to said lever and a lower end in sealing engagement with and anchored to the floor of the cab; a lower flexible sealing member circumscribing said lever and said helical spring, said lower flexible sealing member having an upper end in sealing engagement with and anchored to said cab floor, and a lower end in sealing relationship with respect to said shift lever.

16. The vehicle according to claim 14 wherein said helical spring has said other end seated in a shift cover member, and said lower flexible sealing member having its lower end anchored to and in sealing engagement with said shift cover member.

17. The vehicle according to claim 3, 4, 5, 6, 7, or 9, wherein said cab has a front portion and a rear portion, said cab being tiltable about a tilting axis extending across the front portion of said cab, and said cab including in the rear portion means for resiliently engaging the vehicle chassis in the closed position.

18. The vehicle according to claim 17 wherein said rear portion of said cab further comprises means for releasably securing said cab to said chassis in the closed position.

19. A gear shift lever apparatus suitable for use with a tilt cab vehicle, comprising
(a) a shift lever;
(b) a support means for mounting said apparatus on the floor of a vehicle cab;
(c) said support means having an opening through which said shift lever extends;
(d) said shift lever having an upper end above said support means and a lower end below said support means and adapted for releasable engagement with means for transferring shift lever motion to a vehicle gear train;
(e) resilient means below said support means for extending under compression between said support means and said shift lever.

20. The apparatus according to claim 19 wherein said resilient means includes a spring for biasing the lower end of said lever away from said support means.

21. The apparatus according to claim 20 wherein said spring is a helical spring circumscribing said lever, and having one end engaged with said support means and the other end operatively engaged with said lever.

22. The apparatus according to claim 20 or 21 comprising holding means for receiving the lower end of said spring and holding said lever against movement upwardly through said opening in said support means.

23. The apparatus according to claim 22 wherein said lever defines a ball portion above the lower end of said lever, and said holding means includes a socket means for engaging said ball portion.

24. The apparatus according to claim 23 wherein said holding means has a lower end for carrying said socket and an upper end for engaging said spring, and said apparatus having a retaining spring with one end positioned on the lever member and the other end positioned on an inner portion of said holding means to bias said lever upwardly and said ball portion into engagement with said socket means carried by said holding means.

25. The apparatus according to claim 19 wherein said resilient means includes a spring for biasing the lower end of said lever away from said support means, and comprising a sealing member circumscribing an upper portion of said shift lever, said upper sealing member having an upper end in sealing engagement with said lever and a lower end in sealing engagement with said support member, a lower flexible sealing member circumscribing a portion of said lever and said spring, said lower flexible sealing member having an upper end in sealing engagement with said support member and a lower end in sealing relationship with respect to said shift lever.

26. The apparatus according to claim 25 wherein said spring has an end seated in a shift cover member, and said lower flexible sealing member has its lower end in sealing engagement with said cover member.

27. The apparatus according to claim 19, 20 or 21 comprising means for sealing the interface between said shift lever and said support member.

28. The apparatus according to claim 27 wherein said sealing means includes an upper flexible sealing member circumscribing an upper portion of said shift lever, said upper sealing member having an upper end sealingly engaged with said shift lever and a lower end sealingly engaged with said support member.

29. The apparatus according to claim 27 wherein said sealing means includes a lower flexible sealing member circumscribing a lower portion of said shift lever, said lower flexible sealing member including an upper end in sealing engagement with said support member and a lower end in sealing relationship with respect to said shift lever.

30. The vehicle according to claim 27 wherein said sealing means includes an upper flexible sealing member circumscribing an upper portion of said shift lever, said upper sealing member having an upper end in sealing engagement with said shift lever and a lower end in sealing engagement with said support member, and a lower flexible sealing member circumscribing a lower portion of said shift lever, said lower flexible sealing member having an upper end in sealing engagement with said support member and a lower end in sealing relationship with respect to the shift lever.

31. A tilt cab vehicle having a gear shift lever apparatus that moves with the cab when it is tilted for access to other parts of the vehicle, comprising
(a) a tiltable cab having a floor and being tiltable from a closed position where said cab covers certain parts of said vehicle and an open position where said certain parts of said vehicle are exposed for access;
(b) a shift lever;
(c) means for transferring shift lever motion to a gear train in said vehicle;
(d) said shift lever, extending through said cab floor, having an upper end exposed within the cab for shifting by an operator and a lower end in releasable engagement with said means for transferring the lever motion to the gear train,
(e) said shift lever being tiltable with said cab floor, said lower end being disengaged from said transfer means when said cab is in the open position and engaged with said transfer means when said cab is in said closed position;
(f) isolation means for substantially isolating said lever from cab movement when said cab is in the closed position; and
(g) holding means for holding said lever and being tiltable with said cab, said isolation means including resilient means for biasing said lever in engagement with said holding means and resiliently mounting said lever and holding means with respect to said cab floor such that movement of said cab when in closed position is substantially independent of said lever and said holding means.

* * * * *

UNITED STATES PATENT OFFICE
CERTIFICATE OF CORRECTION

Patent No. 4,269,282                 Dated May 26, 1981

Inventor(s) Leslie A. Meacock, II et al.

It is certified that error appears in the above-identified patent and that said Letters Patent are hereby corrected as shown below:

In claim 4, line 1, the "2" should read --3--.

In claim 5, line 1, the "3" should read --4--.

In claim 6, line 1, the "4" should read --5--.

In claim 8, line 1, the "6" should read --7--.

In claim 9, line 1, the "7" should read --8--.

In claim 10, line 1, the "8" should read --9--.

In claim 11, lines 1 and 2, it should read as follows:  --a vehicle according to claims 1, 2, 4, 5, 6, 7, 8, 9 or 10--.

In claim 12, line 1, the "10" should read --11--.

In claim 13, line 1, the "10" should read --11--.

UNITED STATES PATENT OFFICE
CERTIFICATE OF CORRECTION

Patent No. 4,269,282        Dated May 26, 1981

Inventor(s) Leslie A. Meacock, II et al.

It is certified that error appears in the above-identified patent and that said Letters Patent are hereby corrected as shown below:

In claim 15, line 1 should read as follows:
--the vehicle according to claims 5, 6, 7, 8, 9 or 10--.

In claim 16, line 1, the "14" should read --15--.

Signed and Sealed this

Seventeenth Day of November 1981

[SEAL]

Attest:

Attesting Officer

GERALD J. MOSSINGHOFF

Commissioner of Patents and Trademarks